May 8, 1962 W. H. KLIEVER 3,034,113

BINARY SCALE READING SYSTEM

Filed Oct. 28, 1957 4 Sheets-Sheet 1

INVENTOR.
WALDO H. KLIEVER
BY Max L. Wymore
AGENT

May 8, 1962 W. H. KLIEVER 3,034,113

BINARY SCALE READING SYSTEM

Filed Oct. 28, 1957

4 Sheets-Sheet 2

INVENTOR.
WALDO H. KLIEVER
BY Max L. Wymore
AGENT

INVENTOR.
WALDO H. KLIEVER
BY
Max L. Wymore
AGENT

BINARY SCALE READING SYSTEM

Filed Oct. 28, 1957 4 Sheets-Sheet 4

| | ON ZONE 0 | | ON ZONE 1 | | ON ZONE 2 | |
|---|---|---|---|---|---|---|
| | BRIGHTEST WINDOW | READ BINARY | SWITCH TO | READ BINARY | SWITCH TO | READ BINARY |
| 0 | $B_0$ | 0 | $B_1$ | 0 | $B_2$ | 0 |
| 1 | $A_0$ | 1 | $A_1$ | 0 | $B_2$ | 0 |
| 2 | $B_0$ | 0 | $B_1$ | 1 | $A_2$ | 0 |
| 3 | $A_0$ | 1 | $A_1$ | 1 | $A_2$ | 0 |
| 4 | $B_0$ | 0 | $B_1$ | 0 | $B_2$ | 1 |
| 5 | $A_0$ | 1 | $A_1$ | 0 | $B_2$ | 1 |
| 6 | $B_0$ | 0 | $B_1$ | 1 | $A_2$ | 1 |
| 7 | $A_0$ | 1 | $A_1$ | 1 | $A_2$ | 1 |
| 0 | $B_0$ | 0 | $B_1$ | 0 | $B_2$ | 0 |
| 1 | $A_0$ | 1 | $A_1$ | 0 | $B_2$ | 0 |

INVENTOR.
WALDO H. KLIEVER
BY
Max L. Wymore
AGENT

United States Patent Office 3,034,113
Patented May 8, 1962

3,034,113

BINARY SCALE READING SYSTEM

Waldo H. Kliever, 2472 Overlook Road, Cleveland Heights 6, Ohio

Filed Oct. 28, 1957, Ser. No. 692,638
16 Claims. (Cl. 340—345)

This invention relates to a high speed system for automatic reading of a binary scale and reader combination such as that set forth and claimed in patent application S.N. 573,154 filed March 22, 1956, entitled "Binary Scale Reader," now U.S. Patent No. 2,960,689 issued November 15, 1960, of which the applicant is a joint inventor. More specifically this invention relates to a pulse type electronic system for the automatic reading of a binary scale and reader combination of the type indicated in a manner similar to that of the system which is the subject of applicant's copending application S.N. 617,415 entitled "Binary Scale Reading System" filed October 22, 1956, now U.S. Patent No. 2,970,292, issued January 31, 1961.

It is an important object of this invention to provide an improved pulse type electronic reading system for a binary scale and reader combination with the attendant advantages of electronic circuitry, namely rapid reading, elimination of mechanical moving parts and providing high sensitivity.

It is a further important object of this invention to provide a system for reading a binary scale and reader combination in which the reading or interrogation can be controlled or carried out in a prearranged program.

It is still another important object to provide a reading system for a binary scale and reader combination in which the interrogation accuracy is independent of temperature and remains relatively constant over a wide range of temperatures.

In accordance with the invention the reading system comprises a first pair of sensing devices having an output circuit adapted to produce on command an output signal indicative of the one of the pair of sensing devices most highly activated.

The system further includes a first bistable circuit means having two inputs and two outputs adapted to develop and sustain a first readout signal on one of the outputs in response to the application of an output signal from the first pair of sensing means and means for applying the output signal from the first pair of sensing means to one input of the first bistable circuit means. The system further includes a second pair of sensing means connected in a bridge circuit having two outputs adapted to produce an output signal on the outputs, on command, representative of the activation of the sensing means, a pair of gate means each having at least two inputs and an output, with a first input connected to each of the bridge outputs and a second input connected to each output of said first bistable circuit means. The system further includes a second bistable circuit means having two inputs and two outputs adapted to develop and sustain a second readout signal on one of the outputs in response to the application of a gate voltage to one input and means for applying a gate voltage from the gate to an input of the bistable circuit means. The system further includes a reading control means adapted to supply an interrogation pulse to each pair of sensing means on command and further adapted to supply a reset voltage to a second input of the first, second and succeeding bistable circuit means to reset the bistable circuit means to a predetermined state prior to a subsequent reading.

For a better understanding of the present invention, together with other and further objects thereof, reference is had to the following description taken in connection with the accompanying drawing and its scope will be pointed out in the appended claims.

The conventional binary scale has $n$ columns of effectively transparent and effectively opaque areas arranged in a conventional binary progression, each having $2^n$ rows, where $n$ is the number of binary digits in the scale. The conventional binary progression is one in which the effectively transparent and effectively opaque areas are disposed in columns such that each column represents ascending powers of two.

Where data is a number in the binary system, or scale of two, in which only the digits 0 and 1 occur, the number 2 in the normal decimal scale corresponds to the number 1 0 in the binary scale, and may be represented by the simultaneous states of two signals, the first of which is in the 1-state and the second in the 0-state. Similarly, the decimal scale number 3 is represented by both signals being in the 1-state and the decimal number 4 by three signals, the first of which is in the 1-state and the other two in the 0-state.

The signals may have a variety of physical forms, depending on the scale and reader, usually electrical or mechanical in nature, although signals of an optical, magnetic or other nature could be employed if desired. The data in the form of signals is commonly transmitted from an input or source to an output by way of one or more channels in the form of pulses which again may assume various physical forms. The absence of a pulse, in the ordinary significance of the term, on any significant channel or at any significant instant, may represent a digit 0 in the appropriate place in a number, and may also be regarded as the "pulse" or like phenomenon in the same way as that which represents the digit 1, since it has a discrete and unique interpretation.

From this it follows that, if a digit—say, 0—is to be represented by the absence of a pulse in a significant place in the pattern, the corresponding effectively opaque or effectively transparent area may be physically indistinguishable from its general background—for example, if the effectively opaque or effectively transparent areas appear on an effectively opaque or effectively transparent backing, an effectively opaque or effectively transparent area representing the digit 0 is constituted by a significant zone of the surface of the backing which may not be specifically defined by a boundary. The term effectively opaque or effectively transparent area is to be understood as including such a significant, though physically undefined, zone.

In this specification, the term "effectively opaque area" or "effectively transparent area" will be used to signify any durable discrete phenomena which is capable of identification and presentation as a signal to which a unique interpretation can be assigned. Such areas are to be understood as being effectively transparent or opaque to all forms of electromagnetic energy as well as physical movement. The process of identification and presentation will be termed herein "reading" and the term "durable" is intended to indicate that the effectively opaque areas and effectively transparent areas are not destroyed or changed by the reading process. A signal may be constituted by an electrical pulse or a mechanical displacement or any other identifiable occurence such as an optical, magnetic or audible effect. A group or train of signals will be understood to include the case of a single signal or the absence of a signal in a single significant place where such a single significant place has a definite or discrete interpretation. The term "decimal digit position" is used to identify a particular row. A natural binary scale having five columns will have 32 rows corresponding to 32 digit positions ranging from digit 0 position to digit 31 position.

The present invention is primarily concerned with an electronic system for the automatic reading of a reader which, when read in conjunction with a natural binary scale, generates signals which represent, in digital form, the data to be transmitted. This data may have any desired significance but frequently represents the instantaneous position of a movable member, or the value of a function such as a trigonometrical ratio of an angular displacement of a rotatable member.

Preferably the binary scale and reader are constituted by areas representing a change in the characteristic of a surface and the reading means comprises means for detecting and responding to the said change.

The change may be of an optical nature and the reading means may comprise a light-sensitive element responsive to the optical change. Thus, for example, the binary scale and reader may comprise a plurality of transparent areas on a generally opaque background, or vice versa. The reading means may then comprise one or more light sources and one or more photo-cells located on opposite sides of the scale and the reader and a means is provided for causing relative movement between the scale and reading means. Where the reading means comprises single light sources and a plurality of photo-cells the reading may be accomplished by switching the photo-cells. Where the reading means comprises single photo-cells and a plurality of light sources the reading may be accomplished by switching the light sources. Where the reading means comprises both a plurality of light sources and a plurality of photo-cells, either the light sources or photo-cells may be switched to accomplish reading as will be understood by those skilled in the art.

Commonly, the reader used with a natural binary scale constructed with opaque areas representing binary "0" and transparent areas representing binary "1," comprises a single transparent area or slit traversing the columns of the scale parallel to the rows. The dimension of said area, measured along the column, is generally the same as the dimension of the transparent area of the column having the finest divisions or as commonly known in the art as the least significant column, since it represents the least significant digit. As the scale is traversed by the reader each segment of the columns in the row defined by the reader is in turn exposed to the light source and a photo-cell. Thus, if a row in a scale of five columns, were read in proper sequence such that the readings were:

1st column—opaque
2nd column—transparent
3rd column—transparent
4th column—opaque
5th column—transparent this would correspond to the binary number 10110 or the decimal number 22. This row then would be the decimal digit 22 position. In writing numbers in the binary scale, the usual convention of placing the most significant number first will be adopted throughout this specification.

In the conventional binary scale such as shown in FIG. 2, in moving the above reader from row 15 to row 16, a change from transparent to opaque occurs in the first four columns, and the change from opaque to transparent occurs in the fifth column. If the light-sensitive element reading the fifth column be delayed in noting the change in the fifth column, a signal is produced misapprehending all five columns as being opaque giving a decimal digit reading of 0 instead of 16.

While certain prior art binary scales, such as the reflected binary scale, have been designed to obviate this difficulty by using a code which permits a change in only one column in progressing from one number to another, they have several other disadvantages. The first disadvantage is that the code cannot readily be used for arithmetic purposes. A conversion to the natural binary code is required before arithmetic can be readily accomplished. Secondly, its accuracy is limited by the accuracy of the divisions in all the columns, and since all columns must be read with the same accuracy as the column having the finest divisions, skewing between the reader and the scale cannot be tolerated. This places serious tolerance restrictions on the manufacture and mechanical mounting of such a scale and its associated reader. Thirdly because the more significant columns can only be resolved on the small reader slit, the amount of light which can be directed to the light sensitive element is limited, thus limiting the sensitivity obtainable. The natural binary scale if read in the normal manner also has some of the disadvantages of the reflected binary scale in addition to its ambiguity.

In the drawings, FIGURES 1 and 2 are a circuit diagram in block form of a complete electronic reading system according to this invention for a binary scale and reader combination of the type disclosed and claimed in my copending application S.N. 573,154 filed March 22, 1956, entitled "Binary Scale Reader," now U.S. Patent No. 2,960,689 issued November 15, 1960.

Figure 1:
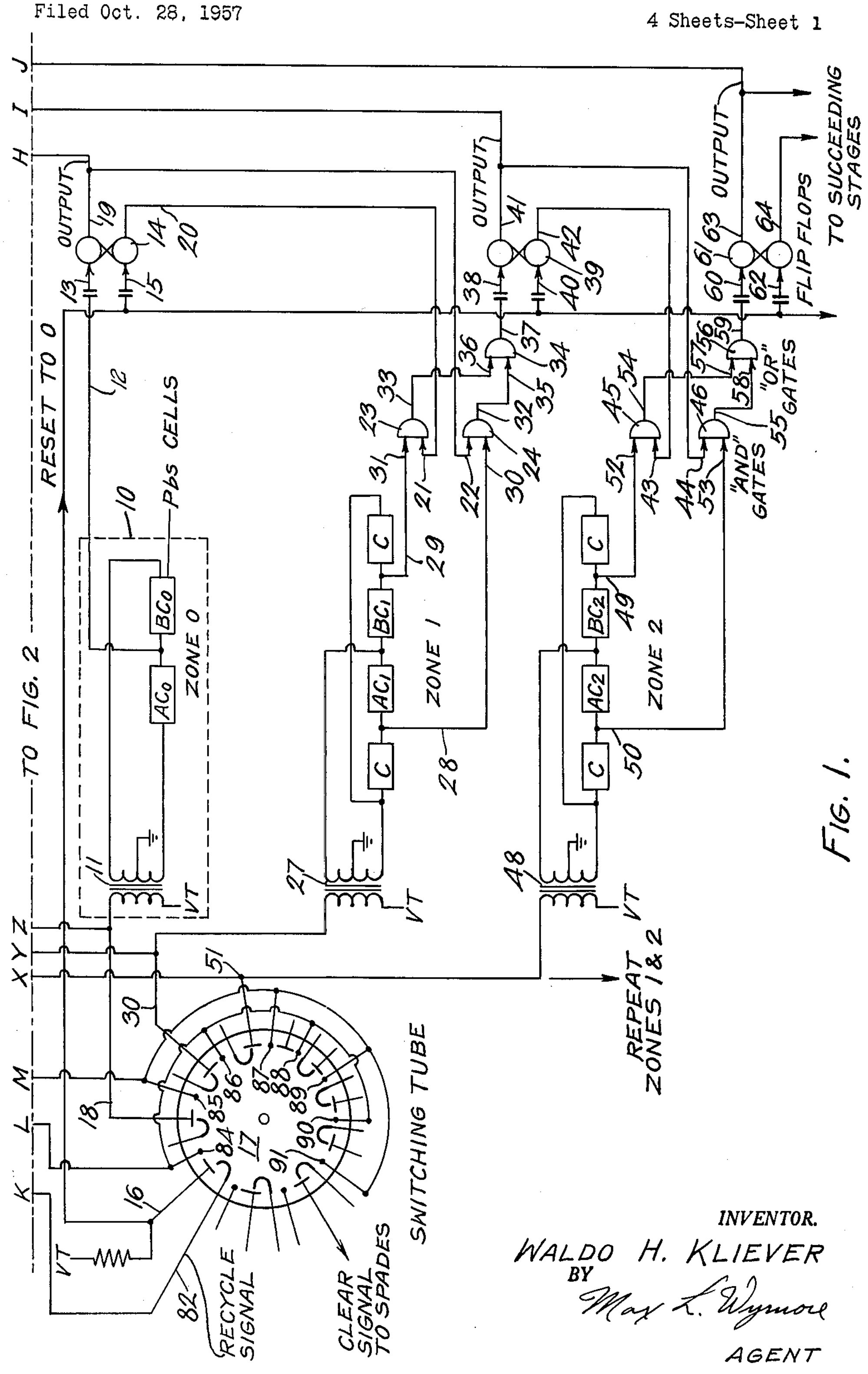
Figure 2:
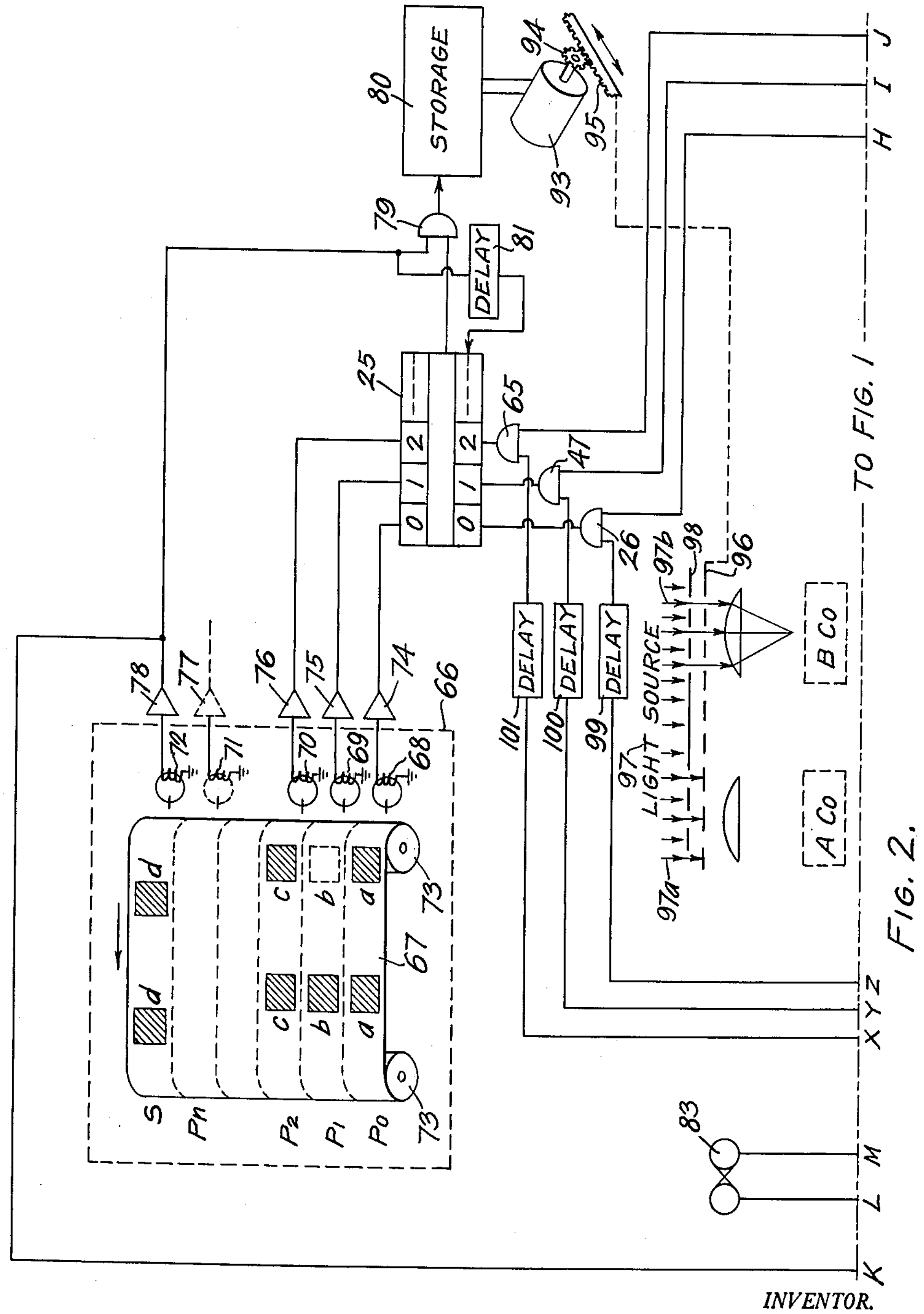

Referring to FIGURES 1 and 2 of the drawings, there is shown a block diagram of a complete pulsed scale reading system embodying this invention. The system comprises a pair of photoelectric sensing devices AC*o* and BC*o*, which may conveniently be lead sulphide photocells, connected in a bridge circuit 10 including a pulse transformer 11 and having an output 12. The output of bridge circuit 10 is connected to an input 13 of flip-flop 14. Input 15 of flip-flop 14 is connected to an output 16 of a switching means 17 such as a magnetron type multiple position beam switching tube. For example tube 17 may comprise a MBS 6700 tube such as that produced by the Burroughs Corporation, Detroit, Michigan, and as disclosed and claimed in Patent No. 2,721,755 to Kuchinsky et al., entitled "Multi-Position Beam Tube" filed July 24, 1953. Such tubes have three arrays of electrodes surrounding the elongated thermionic cathode. A cylindrical array of symmetrically disposed beam forming and directing electrodes, known as space electrodes, surrounds the cathode and is concentric with respect to it. Each spade electrode is insulated from the other spade electrodes and is usually connected to a source of potential which is positive with respect to the cathode through a spade impedance which usually is a resistor. The spade electrodes are usually coextensive in length with the electron emissive portion of the cathode and have a curved, usually U-shaped, transverse cross-sectional configuration. The open part of the spade faces outwardly with respect to the cathode.

An array of symmetrically disposed electron receiving or target electrodes surrounds the spades and constitutes the outer array of electrodes of the tube. The target electrodes are equal in number to the spade electrodes and each target is aligned with the space between two adjacent spades whereby electrons which pass through the space may impinge on the target electrode which is associated therewith. Like the spades, each target electrode is connected to a source of potential which is positive with respect to the cathode through an impedance member which is usually a resistor. The output signal from each target electrode is developed across its target impedance member, such as R1 or pulse transformer 11.

The third array of electrodes comprises a plurality of rod-like beam switching electrodes which are equal in number to the number of spades. Normally, each of the switching electrodes is disposed between an edge of a spade and the target associated with the next adjacent spade. The beam switching electrodes are normally maintained at a positive potential, but this potential is reduced when the switching electrode (or electrodes) are to perform their beam switching function.

When all of the spades are at the potential of the spade power supply, the relationship between the electrostatic and magnetic fields is such that electrons emitted from the cathode follow curved paths around the cathode and substantially no electrons impinge on the spades or other outer electrodes of the tube. If, however, the potential on one of the spades is lowered to, or near to, the potential of the cathode, the configuration of the electrostatic field is changed, especially in the vicinity of the spade having the lowered potential, and a stream or beam of electrons is formed between the cathode and the leading edge of that spade. The edge of the spade to which the beam is attracted is determined by the direction of rotation of the electron beam within the tube (which is determined by the polarity of the magnetic field which permeates the tube). The electron beam locks in at the edge of the spade which is furthest in the direction of the rotation of the beam, and this edge is called the "leading" edge. The opposite edge of the spade is the lagging edge. The electrons impinging on the edge of the spade cause electron flow through the spade impedance and, if the spade resistor value is properly chosen, the electron flow therethrough reduces the potential of the spade sufficiently to maintain the beam "locked in" even though the external means for reducing the potential of the spade be removed. However, if the switching electrode or grid at the next adjacent spade has its potential reduced, the electron beam which is locked on the lagging spade (and which also impinges on the target electrode associated with that spade) changes its shape. If the reduction in potential on the switching electrode is sufficient, the beam will spread to the extent that part of the electrons of the beam spread and impinge on the leading spade with which the switching electrode is associated, causing a voltage drop on that spade. Because of the tendency of the electron beam to be rotated by the magnetic field as previously mentioned, the beam then switches to the spade having the lowered potential which is furthest in the direction of rotation of the beam.

The primary winding of pulse transformer 11 is connected to an output 18 of tube 17 for interrogation purposes as will be more fully explained at a later point in the disclosure. Output 19 of flip-flop 14 corresponding to input 13 and output 20 corresponding to input 15 are connected to inputs 21 and 22 of a first pair of "and" gates 23 and 24 respectively, each having two inputs and an output. Output 19 is also connected to an input of computer 25 through a first input of gate 26. A second input of gate 26 is connected through delay 99 to output 18 of tube 17.

The system also includes a second pair of photocells AC1 and BC1 connected in a bridge circuit to include pulse transformer 27 and having two outputs 28 and 29. A pair of compensating cells C, similar to A1 and B1 are connected in series therewith, for the purpose to be explained later.

The primary of pulse transformer 27 is connected to an output 30 of tube 17 for interrogation purposes as will be explained. Outputs 28 and 29 of the bridge circuit are connected respectively to inputs 30 and 31 of gates 24 and 23, each having an output 32 and 33. An "or" gate 34, having two inputs 35 and 36 and an output 37, is connected with inputs 35 and 36 connected to outputs 32 and 33 of "and" gates 24 and 23 respectively. Output 37 of "or" gate 34 is connected to input 38 of flip-flop 39 having two inputs 38, 40 and two outputs 41, 42. Output 16 of tube 17 is connected to input 40 of flip-flop 39. Outputs 41 and 42 are connected respectively to inputs 43 and 44 of "and" gates 45 and 46 respectively. Output 41 is further connected to an input of computer 25 through a first input of gate 47. A second input of gate 47 in connected to output 30 of tube 17 through delay 100.

The system may also include a third pair of photo-cells AC2 and BC2 connected in a bridge circuit to include pulse transformer 48 and having two outputs 49 and 50. A pair of compensating cells C, like AC2 and BC2 are connected in series therewith, for the purpose to be explained later. The primary of pulse transformer 48 is connected to an output 51 of switching tube 17 for interrogation purposes as will be explained. Outputs 49 and 50 of the bridge circuit are connected respectively to inputs 52 and 53 of gates 45 and 46, each having an output 54 and 55 respectively. An "or" gate 56, having two outputs 57 and 58 and an output 59, is connected with outputs 54 and 55 of "and" gates 45 and 46 respectively. Output 59 of "or" gate 56 is connected to input 60 of flip-flop 61 having two inputs 60, 62 and two outputs 63, 64. Output 16 of switching tube 17 is connected to input 62 of flip-flop 61. Outputs 63 and 64 are connected to an input of a next pair of "and" gates and so on depending on the number of digits to be read. Output 63 is further connected to an input of computer 25 through a first input of gate 65. A second input of gate 65 is connected to output 51 of tube 17 through delay 101.

A reading control 66 may conveniently comprise an elongated magnetic recording medium 67 having a plurality of magnetizable tracks, P*o*, P1, P2, . . . P*n* and S. A plurality of magnetic heads 68—72 are positioned adjacent each track such that when the recording medium is traversed past the heads by means of reels 73, the portions of each track "*a*" through "*d*" that have been previously magnetized will induce current flow in the head 68—72 associated with that track and develop an output signal on the head so activated. Amplifiers 74—78 may be required to amplify the signal induced in the heads to a usable level. Scale interrogation track S reading head 72 is connected through amplifier 78 to an input of gate 79 which is connected between the output of computer 25 and the input of storage means 80 and through delay 81 to a clearing input of computer 25 to clear the previous reading. Head 72 is further connected through amplifier 78 to spade 82 of switching tube 17 to form beam on target connected to output 16 to reset the flip-flops and ready the tube for stepping. A multivibrator 83 having the outputs thereof connected to alternate switching electrodes 84—91 steps the tube at the frequency of the multivibrator. Programmer track reading heads 68—70 are connected through amplifiers 74—76 to the programmer inputs of computer 25. Servo motor 93 is connected to the output of storage means 80. The shaft of servo motor 93 drives a pinion gear 94 and associated rack 95. Attached to rack 95 is a natural binary scale 96 which is movably positioned between light source 97, reader 98 (least significant column shown) and photo-cells AC*o* and BC*o*.

Figure 3:
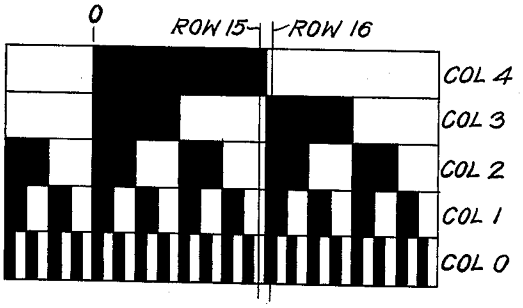
FIGURE 3 is a representation of an enlarged binary scale of natural form.

FIGURE 3 illustrates a natural binary scale. The natural binary scale 96 has *n* columns of effectively transparent and effectively opaque areas arranged in a natural binary progression, each having $2^n$ rows, where *n* is the number of digits in the scale. The natural binary progression is one in which the effectively transparent and effectively opaque areas are disposed in columns such that each column represents ascending powers of two. The scale shown having five columns with 32 rows representing positions zero to 31.

Figure 4:
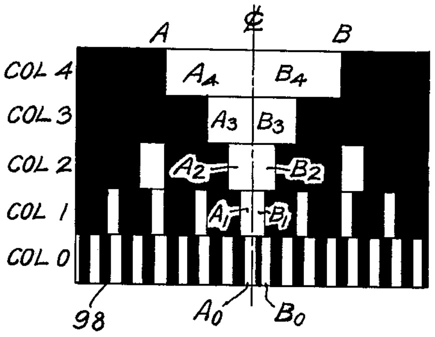
FIGURE 4 shows an enlarged reader for a natural binary scale constructed according to the teaching set forth in my copending application set forth above.

FIGURE 4 shows a reader for a natural binary scale constructed in accordance with the teaching of my copending application S.N. 573,154 filed March 22, 1956, entitled "Binary Scale Reader," now U.S. Patent No. 2,960,689 issued November 15, 1960. The improved reader 98 comprises a plate having a plurality $n$ of columns of effectively opaque and effectively transparent durable areas, where $n$ is the number of digits in the binary scale, adjacent columns progressing from one side of the reader connoting successively greater digital significance, with one class of such reader areas disposed about a center line, the reader areas in each column of the reader being identically finite and less than the dimension, measured along the column, of like areas of the corresponding column of the conventional binary scale with which it is to be used, and the reader areas occur in each direction, along the column, away from the center line at the same cyclic repetition as the like areas of the corresponding column of the conventional binary scale, the resulting array of reader areas in each column of the reader more significant than the least significant column of the reader being symmetrically disposed about the center line, and the reader areas of the least significant column of the reader being identically finite and up to twice the dimension, measured along the column, of like areas of the least significant column of the conventional binary scale with which it is to be used and occur at the same cyclic repetition. The advantages of this reader over the use of a conventional single slit reader resides in the unambiguous readings obtainable, high resolution, high sensitivity in reading and increased reading accuracy while at the same time permitting greater tolerances in manufacture and mechanical mounting without adversely affecting reading accuracy. It will be noted that with the reader of FIGURE 4 two windows or reading areas are provided for each column or digit identified as A and B. These windows have opaque and transparent areas like those of the corresponding scale, FIGURE 2, but are phased differently. Two lamps or two photo-cells are provided for each column or zone (one for the A side, one for the B side). Either the lamps or the cells can be switched to obtain the desired reading. A sequential switching program is controlled from the so-called least significant (but actually most important column). The fine-column (least significant) readings select the appropriate reader for the successively higher-order digits. This method makes sure that all digits have correct values at the time of reading, even when the reading is very near a position where several digits need to change.

Figure 5:
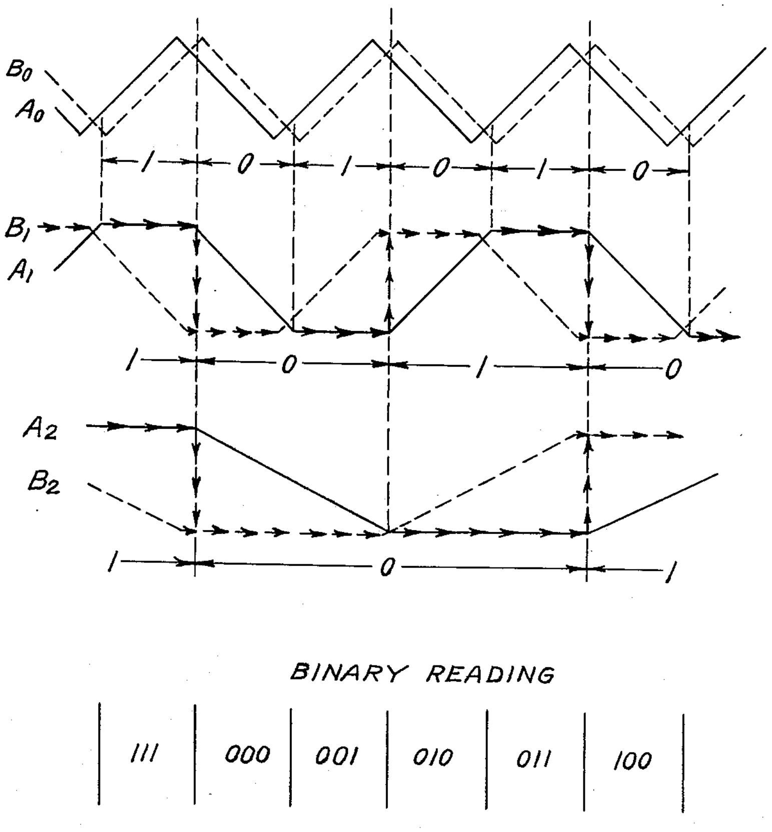
FIGURE 5 illustrates graphically the light intensity and switching sequence produced by the reader of FIGURE 4 when used with the scale of FIGURE 2 representing the first five decimal positions 0 to 4 of a 3 digit binary code.

Variations in light intensity reaching the cells AC and BC as the scale moves past the reader are shown in FIGURE 5. The switching circuit of FIGURE 1 interprets the light densities of these areas as binary numbers, instantaneously representing the position of the scale. To achieve this result, the sections of scale in each reader window must be properly phased. Because it is easier and more accurate to compare densities than it is to determine absolute values, the cross-over point for digits on the 0 (finest) zone was chosen as the point at which the readings of A*o* and B*o* are equal. Also, A*o* and B*o* are 90 degrees out of phase. The contrast is better if they are 180 degrees apart, however, with the 90 degree phasing it is possible to interpolate to gain higher resolution. It will be readily understood, however, that other phase relationships may be used.

Figure 6:
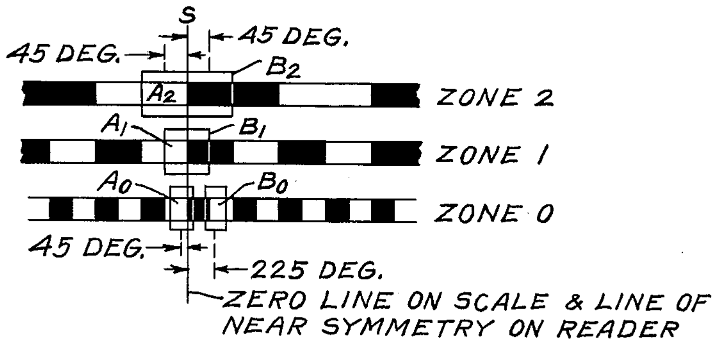
FIGURE 6 is an expanded scale and reader of FIGURES 2 and 3 with a single column of transparent reader areas, showing the phasing for the various columns or zones including a table of values that demonstrate the scale logic as the reader is moved to the right with respect to the scale.
Figure 7:
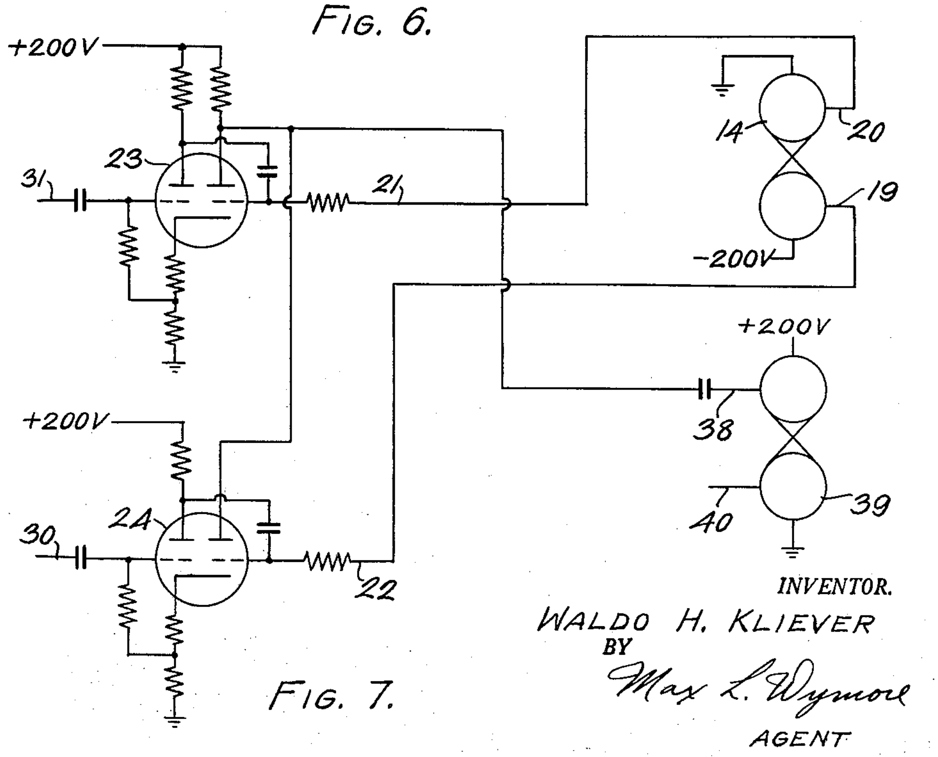
FIGURE 7 shows a preferred form of the gate circuits of FIGURE 1 schematically.

The phasing for zones 1 and higher is designed to provide good contrast at the points where zone 0 calls for a switch of zone windows. The phasing of all the zones can be better understood by referring to FIGURE 6, which shows one opening for each window on an enlarged scale. In FIGURE 6, S is the center line for all reader zones beyond the 0 zone and is placed on the natural binary scale at the binary 000 position. In this position, the reader is just at the change from binary 111 to binary 000. Note that A*o* is 45 degrees to the negative side or left and B*o* is 225 degrees to the positive side or right, making them 90 degrees (same as 270 degrees) apart.

Windows in zones beyond 0 are 45 degrees of the corresponding scale to the right and left of the center line respectively. This and the fact that the windows or reader areas on the reader for all zones beyond 0 are one-half the width of the corresponding scale areas result in the flat-top waves shown for zones 1 and 2 in FIGURE 5, so the readings theoretically on zones 1 and higher are always all binary 0 or all binary 1, and no readings with partial valves need be identified.

Because of the 90 degree position of the two areas A*o* and B*o*, the intensity of light passing therethrough, yield alternate high-level and low-level points of equality. The high intensity points of equality are selected as the "significant" cross over points, calling for a change of digits in the 1 zone or column.

The logic for the 0 zone calls for two simple laws:

(1) If A*o* is brighter than B*o*, read 1.
If B*o* is brighter than A*o*, read 0.
(2) If the 0 zone reads 1, switch 1 zone to read A.
If the 0 zone reads 0, switch 1 zone to read B.

Following the above logic, the 1 zone has cross-overs at the same position as the 0 zone. All the higher-order zones have cross-overs not coincident with those of the next lower order.

While the selection of A1 or B1 or zone 1 depends on whether A*o* or B*o* is brighter, the selection of A2 or B2 does not depend on whether A1 or B1 was read, but only whether the reading was bright or dark. In other words it depends on whether the previous reading was 1 or 0. Rule 2 above applies, and the logic for the entire scale can now be stated:

(1) For zone 0—
If A*o* is brighter than B*o*, read 1
If B*o* is brighter than A*o*, read 0
(2) For any other zone—
Read A if the reading of the zone of next lower order is 1
Read B if the reading of the zone of next lower order is 0
(3) For the selected area of any zone above 0 order—
If the light intensity is bright, read 1
If the light intensity is dark, read 0

The table of FIGURE 6 will be seen to demonstrate scale logic as the reader windows are moved to the right. For example, the first line shows that if B*o* is the brightest window, read 0 and switch to B1. Then switch to B2 and again read 0. Lines below apply as reader moves.

As noted previously, the intensities are theoretically such that on all zones of higher-order than zone 0, the readings are either a binary 1 or a binary 0 and it is not necessary to distinguish partial values. In practice with the finest division of the scale being 0.0005 inch, a 2-mil spacing between the scale and reader and moderately parallel light beams, the lowest light intensity of a binary 1 reading is five times the highest intensity of a binary 0 reading. This, together with the large windows or reading areas in the higher order zones, makes readings highly independent of skew between scale and reader. Accuracy of measurement depends on the fine or 0 zone and the higher-order zones are essentially counters, permitting relatively large mechanical and electrical tolerances in the system without sacrifice of accuracy. It will be recognized that the scale logic will be reversed if when A*o* is brighter it is read as a 0 and when B*o* is brighter it is read as a 1.

Referring to FIGURE 1, when scale 96 is in the 0 or binary 000 position with respect to reader 98 and a magnetized spot *d* on interrogation track S of control 66 passes under head 72, a signal is developed and applied to spade 82 of tube 17, focusing a beam on target connected to output 16. The output of multivibrator 83 is applied to switching grids 84—92 alternately, causing the beam to be formed and stepped around to impinge on target outputs 16, 18, 30, 51 and so on in succession. When the beam strikes output 16, a reset pulse is sent to the 0 inputs 15, 40 and 62 of flip-flops 14, 39 and 61 through a capacitor which prevents the target voltage VT from reaching these inputs. The reset pulse functions to reset all flip-flops to the 0 state. The beam is then stepped to output 18 by the next cycle of output signal from multivibrator 83. The time required for switching the beam of tube 17 from one target output to another is a function of the tube circuit parameters and the frequency of oscillation of the multivibrator and may range from a second to as little as 0.1 microsecond. An output pulse is developed on 18 which is applied to the primary winding of pulse transformer 11. The secondary winding of the pulse transformer has a center tap at ground potential and the ends connected to photo-cells AC*o* and BC*o* in series to form a bridge circuit with an output 12 between the photo-cells. These cells may conveniently be of the lead sulphide variety in which the electrical resistance is reduced when the cell is illuminated, for example in one such type of cell, the resistance unilluminated is 100,000 ohms and is reduced to 20,000 ohms when illuminated. When one of the cells AC*o* or BC*o* is illuminated, a signal is developed on output 12 of the bridge of a polarity depending on whether AC*o* or BC*o* is brighter. With the circuit as shown, a negative going pulse appears on the output, when cell AC*o* is brighter than BC*o*, and a positive going pulse appears when cell BC*o* is brighter than AC*o*. Flip-flop 14, as well as 39 and 61, are designed to be responsive to a negative going pulse. Thus, when cell AC*o* is brighter, a negative going pulse is applied to input 13 of flip-flop 14, changing it from the 0 reset state to a 1 state, whereupon a signal appears on output 19 of flip-flop 14 which is read as a 1. If cell BC*o* is the brighter, a positive going pulse is applied to input 13 of flip-flop 14 and since the flip-flop is not responsive to a positive going pulse, the flip-flop remains in the reset or 0 position and no signal on output 19 of flip-flop 14 is read as a 0.

The beam in tube 17 is next switched to target output 30, producing a pulse in the primary winding of pulse transformer 27. The secondary winding of transformer 27 has a center tap at ground potential, with the ends of the winding connected in a bridge circuit with cells AC1 and BC1 in arms of the bridge. A similar temperature compensating cell C, which is always unilluminated is connected in series with each of the cells AC1 and BC1 and subsequent cells. Cell C being unilluminated will automatically compensate for any change in cells AC1 or BC1 due to change in temperature providing an automatic balance of the cells over a wide range of temperatures. When a pulse is fed to transformer 27, a negative pulse will be present on output 28 or 29 respectively when cell AC1 or cell BC1 is bright. Output 28 is connected to one input 30 of gate 24, with the other input 22 thereof, being connected to the 1 output 19 of flip-flop 14. Output 29 is connected to one input 31 of gate 23, with the other input 21 thereof, being connected to the 0 output 20 of flip-flop 14. Gates 23 and 24 each have an output 33 and 32 connected to inputs 36 and 35 respectively of "or" gate 34, and output 37 thereof, is connected to the 1 input 38 of flip-flop 39. Depending on whether there is a signal on output 19 or 20 of flip-flop 14, signifying a 1 or a 0 in zone 0, cell AC1 or BC1 will be read in zone 1. Following the scale logic when, the reading of the next lower zone is a 1, the A cell is read, and when the lower zone reading is a 0, the B cell is read, a signal on output 19 of flip-flop 14 is read as a 1. This signal is applied to input 22 of gate 24, which will pass a signal in response to the illumination of cell AC1. If cell AC1 is bright, a negative going pulse is thus transmitted through gate 24, "or" gate 34, to input 38 of flip-flop 39, which changes from the reset or 0 state to the 1 state and a signal appears on output 41 thereof, which is read as a 1. In event cell AC1 was dark, no transmission through gate 24, could occur, and flip-flop 39 would remain in the reset or 0 state and the absence of a signal on output 41 of flip-flop 39 is read as a 0. A signal will appear on output 42 of flip-flop 39 in this situation. This series of events will be repeated in zone 2 and subsequent zones, the number of which will depend upon the number of digits, zones or columns of the scale to be read.

The signals, if any, which appear on the 1 output of flip-flops 14, 39 and 61 are applied to one input of gates 26, 47, and 65 through delays 99, 100 and 101, which allow sufficient time lag between the tube and flip-flop output signals to permit the flip-flops to assume the state called for by the photo-cells before activating gates 26, 47 and 65. The outputs of gates 26, 47 and 65 are connected respectively to the 0, 1 and 2 inputs of computer 25. When a signal is present on the 1 output of the flip-flops, this signal will be fed to the corresponding input of computer 25 and read as a 1, the absence of a signal will read as a 0. Programmer signals developed by magnetic heads 68—70 are applied through amplifiers 74—76 to a second set of inputs of computer 25. In computer 25, the programmer signals and readout signals from flip-flops 14, 39, and 61 are compared and any difference will appear at the output of computer 25 as an error signal.

Where more zones are to be read than can be provided for by one switching tube, additional tubes may be provided to be actuated by the last position of the previous tube. The last target of each tube will also be used to "kill" the beam in that tube so that no further reading will occur until called for. The signal from amplifier 78 which starts the reading operation is also applied to one input of gate 79, having the other input connected to the output of computer 25, such that an error signal, if any, appearing on the output of the computer 25 will be transferred to the information storage means 80 before the computer is cleared. The computer is also cleared by the signal from amplifier 78, which passes through delay 81, which delays the signal an interval of time to permit the computer output to be passed by gate 79 and stored by information storage means 80. The error signal, if any, stored in information storage means 80 is fed to servo motor 93 which through pinion 94 and associated rack moves the scale attached thereto toward the new position called for by the pattern of magnetized spots *a*, *b* and *c* on programmer tracks P*o*, P1 and P2.

At the beginning of each reading the beam is formed in tube 17 on signal and is stepped to electrodes to first form a reset pulse which returns all flip-flops to the reset or 0 state and then supply pulses in seequence to cause each ascending zone to be read in order.

Assuming that the scale is moved to the 5th or binary 100 position and a reading taken, the BC*o* cell is brightest and a positive going pulse is applied to input 13 of flip-flop 14. Since flip-flop 14 is not responsive to a positive pulse, it will remain in the 0 state and the absence of a signal on output 19 of flip-flop 14 will be read as a 0 by computer 25 through gate 26. The signal appearing on output 20 of flip-flop 14 is applied to one input of gate 23, so that cell BC1 will be read in zone 1. Cell BC1 is dark in this position and no signal will be present on output 29 therefrom to be applied to input 31 of flip-flop 23. Thus there is an absence of signal on output 33 of flip-flop 23 and no signal is applied to input 38 of flip-flop 39, which remains in the zero state and the absence of a signal on the output 41 of flip-flop 39 is read as a zero by computer 25 through gate 47. The signal appearing on output 42 of flip-flop 39 is applied to one input of gate 45 such that cell BC2 is read in zone 2. Cell BC2 is bright and a negative going signal appears on output 49 of the bridge and is fed to input 52 of gate 45, passing therethrough and appears on output 54 thereof. This signal is fed to input 57 of "or" gate 56 and appears on output 59 thereof and is applied to input 60 of flip-flop 61. Flip-flop 61 is responsive to the negative pulse and flips to the 1 state and an output appears on output 63 thereof which is read as a 1 by computer 25 through gate 65. The binary reading is thus 100 corresponding to the 5th or decimal 4 position. As is conventional the least significant binary number appears last. If this is the position called for by the programmer tracks of reading control 66, no error signal will appear on the output of computer 25 to be stored in storage 80 and servo motor 93 will not be activated.

The flip-flops of FIGURE 1 may comprise a Z-8336 flip-flop such as manufactured by the Engineered Electronics Company of Santa Ana, California, and as shown and described on page 6 of their catalog No. 856A, which is a medium-speed, bistable multivibrator circuit. Other similar flip-flop circuits may be used with equal success.

FIGURE 6 illustrates a preferred form of a gate circuit of FIGURE 1 wherein the "and" gates, such as gates 23 and 24 comprise two Z-90002 gates as manufactured by the Engineered Electronics Company of Santa Ana, California, and as shown and described on page 12 of their catalog No. 856A. The "or" gate 34 is formed by cutting the plate resistor out of the output of one circuit and connecting the corresponding plate of the other gate circuit directly to the plate, as shown. In this manner an output on either plate will be present on the combined output, which is then fed to an input such as input 38 of flip-flop 39. Input 31 of gate 23 is fed from output 29 of the photo-cell bridge and input 30 of gate 24 is fed from output 28 of the bridge. Input 21 of gate 23 is connected to output 20 of flip-flop 14 and input 22 is connected to output 19 of flip-flop 14. Other gate circuits may be used, such as diode gates, the requirement being that the flip-flop be responsive to the output signal therefrom. The tube gates are preferable since some gain is obtained. As will be understood in the art, the ground potential as applied to the center tap of the pulse transformers 11, 27 and 48 will depend on the quiescent output voltage appearing on the outputs of the flip-flops. For example if the flip-flop output is say 200 volts positive the center taps of the transformers would be biased at 200 volts positive, such that a negative going pulse would be negative with respect to 200 volts positive.

It will be appreciated that the reading control 66 may comprise any device capable of producing signals according to a prearranged program. As indicated the reading control may consist of a magnetizable record medium having areas magnetized according to such program, punched tape or cards punched according to such program in combination with a cyclic stepping switch or a switching tube which may be self-cycling in operation or be cycled by a series of pulses from a multivibrator on command from a magnetizable storage medium or other such storage medium according to a prearranged program.

Various other stepping means, other than tube 17 disclosed may be used for stepping the reading circuit, such as other electronic or mechanical stepping switches, so long as the speed of stepping is commensurate with the rapidity of reading required. The stepping function may be accomplished directly from the programmer control in one of its many suitable forms.

While the invention has been described with reference to switching the photo-cells, it is to be understood that with suitable circuit modifications light sources 97*a* and 97*b* may be pulesd as an alternative to provide interrogation of the cells.

Although the above described embodiments disclose the binary scale and reader as adapted to be used optically, it is to be understood that the scale and reader may be constructed to be read by other types of sensing devices, i.e., magnetic, inductive, capacitive or mechanical. A similar reading of the scale and reader may be made with suitable sensing means and suitable circuit modifications within the scope of the invention.

Various modifications may be made in the optical sensing arrangement within the teaching of this invention, such as multiple light, single, cell; multiple light, area cell and electro luminescent source, among others as will be understood by those skilled in the art.

While there have been described what at present are considered to be the preferred embodiments of this invention, it will be obvious to those skilled in the art that various changes and modifications may be made therein without departing from the invention. It is aimed therefore in the appended claims to cover all such changes and modifications which fall within the true spirit and scope of the invention.

What is claimed is:

1. A pulsed binary scale reading system comprising in combination: a first pair of sensing means having an output circuit adapted, on command, to develop an output signal indicative of the sensing means most highly activated, a first bistable circuit means having two inputs and two outputs, adapted to develop and sustain a readout signal on one output thereof in response to the application, to a first input thereof, of an output signal from the output of said first pair of sensing means and further adapted to develop and sustain alternately an output signal on the second output thereof in response to the application of a reset voltage to a second input thereof, means for applying the output signal from the first pair of sensing means to a first input of the first bistable circuit means, a second pair of sensing means having an output circuit with two outputs, adapted, on command, to develop output signals representative of the activation of said second sensing means, a pair of gate means, each having two inputs and an output, with a first input of each gate means connected respectively to an output of said second pair of sensing means and a second input of each gate means connected respectively to an output of said first bistable circuit means, a second bistable circuit means, having two inputs and two outputs, adapted to develop and sustain a readout signal on one output in response to the application, to a first input thereof, of an output signal from said gate means and further adapted to develop and sustain alternately an output signal, on the other output, in response to the application to a second input thereof of a reset voltage, means for applying an output signal from said gates to said first input of said second bistable circuit means, and means for applying a reset voltage to a second input of said bitsable circuit means to reset the bistable circuits to a predetermined state in preparation for a reading.

2. A system according to claim 1 wherein the output circuit of the second pair of sensing means includes a pulse transformer connected in a bridge circuit with the sensing means.

3. The reading system as set forth in claim 1 wherein each of the second pair of sensing means has a similar inactivated sensing means connected in series therewith and positioned such as to be at substantially the same temperature as the activated sensing means, whereby any change in the characteristics of the activated sensing means due to a change in temperature will be automatically compensated by an appropriate change in characteristics of the inactivated sensing means.

4. A pulsed binary scale reading system comprising in combination: a first pair of sensing means having an output adapted, on command, to develop an output signal indicative of the sensing means most highly activated, a first bistable circuit means having two inputs and two outputs, adapted to develop and sustain a readout signal on one output thereof in response to the application, to a first input thereof, of an output signal from the output of said first pair of sensing means, and further adapted to develop and sustain, alternately, an output signal on the second output thereof in response to the application of a reset voltage to a second input thereof, means for applying the output signal from the first pair of sensing means to a first input of the first bistable circuit means, a second pair of sensing means having an output circuit with two outputs, adapted, on command, to develop output signals representative of the activation of said second sensing means, a pair of gate means, each having at least two inputs and an output with a first input of each gate means connected respectively to an output of said second pair of sensing means and a second input of each gate means connected respectively to an output of said first bistable circuit means, a second bistable circuit means, having two inputs and two outputs, adapted to develop and sustain a readout signal on one output thereof in response to the application, to a first input thereof, of an output signal from said gate means and further adapted to develop and sustain alternately an output signal, on the other output thereof, in response to the application to a second input thereof of a reset voltage, means for applying an output from said gates to said first input of said second bistable circuit means, interrogation means, including means for developing a reset voltage, comprising means for developing interrogation signals according to a prearranged program, means for applying interrogation signals to the sensing means and means for applying a reset voltage to a second input of said bistable circuit means to reset said bistable circuits to a predetermined state in preparation for a reading.

5. The reading system as set forth in claim 4, wherein the interrogation means is comprised of high speed switching means and the reset voltage is developed at one position thereof.

6. A pulsed binary scale reading system comprising in combination: a first pair of sensing means and a pulse transformer connected in a bridge circuit having an output, adapted, on command, to develop an output signal indicative of the sensing means most highly activated, a first bistable circuit means having two inputs and two outputs, adapted to develop and sustain a readout signal on one output thereof in response to the application to a first input thereof, of an output signal from the output of said first pair of sensing means and further adapted to develop and sustain alternately, an output signal on the second output thereof in response to the application of a reset voltage to a second input thereof, means for applying the output signal from the first pair of sensing means to a first input of the first bistable circuit means, a second pair of sensing means and a pulse transformer connected in a bridge circuit having two outputs, adapted to develop an output signal on the outputs therof, on command, representative of the activation of said second sensing means, a pair of gate means, each having two inputs and an output, with a first input of each gate means connected respectively to an output of said bridge and a second input of each gate means connected respectively to an output of said first bistable circuit means, a second bistable circuit means, having two inputs and two outputs, adapted to develop and sustain a readout signal on one output in response to the application, to a first input thereof, of an output signal from said gate means and further adapted to develop and sustain alternately, an output signal, on the other output, in response to the application to a second input thereof of a reset voltage, means for applying an output signal from said gates to said first input of said second bistable circuit means, interrogation means including means for developing a reset voltage, comprising means for developing interrogation signals in the form of discrete pulses according to a prearranged program, means for applying the developed interrogation pulses to the pulse transformers in the bridge circuits to command the reading of the sensing means, and means for applying a reset voltage to a second input of said bistable circuit means to reset said bistable circuits to a predetermined state in preparation for a reading.

7. The reading system as set forth in claim 6, wherein the interrogation means is comprised of a high speed electronic switching means and the reset voltage is developed at one position thereof.

8. The reading system as set forth in claim 6, wherein each of the second pair of sensing means has a similar inactivated sensing means connected in series therewith and positioned such as to be at substantially the same temperature as the activated sensing means, whereby any change in the characteristics of the activated sensing means due to a change in temperature will be automatically compensated by an appropriate change in characteristics of the inactivated sensing means.

9. A pulsed binary scale reading system comprising in combination: a first pair of sensing means and a pulse transformer connected to a bridge circuit having an output, adapted, on command, to develop an output signal indicative of the sensing means most highly activated, a first bistable circuit means having two inputs and two outputs, adapted to develop and sustain a readout signal on one output thereof in response to the application to a first input thereof, of an output signal from the output of said first pair of sensing means and further adapted to develop and sustain alternately, an output signal on the second output thereof in response to the application of a reset voltage to a second input thereof, means for applying the output signal from the first pair of sensing means to a first input of the first bistable circuit means, a second pair of sensing means and a pulse transformer connected in a bridge circuit having two outputs, adapted to develop an output signal on the outputs thereof, on command, representative of the activation of said second sensing means, a pair of gate means each having two inputs and an output with a first input of each gate means connected respectively to an output of said bridge and a second input of each gate means connected respectively to an output of said first bistable circuit means, a second bistable circuit means, having two inputs and two outputs, adapted to develop and sustain a readout signal on one output in response to the application, to a first input thereof, of an output signal from said gate means and further adapted to develop and sustain alternately an output signal, on the other output, in response to the application to a second input thereof of a reset voltage, means for applying an output signal from said gates to said first input of said second bistable circuit means, interrogation means, including means for developing a reset voltage, comprising means for developing interrogation signals in the form of discrete pulses according to a prearranged program, means for applying the developed interrogation pulses to the pulse transformers in the bridge circuits to command the reading of the sensing means, reading control means comprising means for developing programming signals according to a prearranged program, computer means for comparing the readout signals from each bistable circuit means and the programming signals to develop an error voltage representative of a difference therebetween and means for applying readout signals and programming signals to said computer.

10. A pulsed binary scale reading system comprising in combination: a first pair of sensing means having an output circuit adapted, on command, to develop an output signal indicative of the sensing means most highly activated, first bistable means adapted to develop and sustain a readout signal in response to the application of an output signal from said first pair of sensing means and further adapted to develop and sustain alternatively another output signal in response to the application of a reset voltage thereto, a second pair of sensing means adapted, on command, to develop output signals representative of the activation of said sensing means, a second bistable means adapted to develop and sustain a readout signal in response to an output signal from said second pair of sensing means and a signal from the first bistable means and further adapted to develop and sustain alternatively an output signal in response to the application of a reset voltage, and means for applying a reset voltage to said first and second bistable means to reset same to a predetermined state in preparation for a reading.

11. The system as set forth in claim 10 including means for pulsing the first and second pair of sensing means in sequence to energize same and render each of the pairs of sensing means subject to activation in a predetermined order.

12. The system as set forth in claim 10 wherein, the second pair of sensing means includes a similar unactivated sensing means in series with each of the pair to automatically provide compensation in the characteristics of the sensing means due to changes in temperature.

13. A system according to claim 10 wherein the output circuit of the second pair of sensing means includes a pulse transformer connected in a bridge circuit with the sensing means.

14. A pulsed binary scale reading system comprising in combination a first pair of sensing means, having an output circuit adapted, on command, to develop an output signal indicative of the sensing means most highly activated, first flip-flop means adapted to develop and sustain a readout signal in response to the higher activation of one of said first pair of sensing means, a second pair of sensing means adapted, on command, to develop output signals representative of the activation of said sensing means, and second flip-flop means adapted to develop and sustain a readout signal in response to an output signal from said second pair of sensing means and a readout signal from said first flip-flop means.

15. A pulsed binary scale reading system comprising in combination: a first pair of sensing means having an output circuit adapted, on command, to develop an output signal indicative of the sensing means most highly activated, first bistable means adapted to develop and sustain a readout signal in response to the application of an output signal from said first pair of sensing means and further adapted to develop and sustain alternatively another output signal in response to the application of a reset voltage thereto, a second pair of sensing means adapted, on command, to develop output signals representative of the activation of said sensing means, a second bistable means adapted to develop and sustain a readout signal in response to an output signal from said second pair of sensing means and a signal from the first bistable means and further adapted to develop and sustain alternatively an output signal in response to the application of a reset voltage, interrogation means, including means for developing a reset voltage, comprising means for developing interrogation signals according to a prearranged program, means for applying interrogation signals to the sensing means and means for applying a reset voltage to said first and second bistable means to reset same to a predetermined state in preparation for a reading.

16. The reading system as set forth in claim 15, wherein the interrogation means is comprised of high speed switching means and the reset voltage is developed at one position thereof.

References Cited in the file of this patent

UNITED STATES PATENTS

| | | |
|---|---|---|
| 2,721,990 | McNamey | Oct. 25, 1955 |
| 2,747,797 | Beaumont | May 29, 1956 |
| 2,779,539 | Darlington | Jan. 29, 1957 |
| 2,901,732 | Canning | Aug. 25, 1959 |